United States Patent
Nakamura et al.

(10) Patent No.: US 9,635,234 B2
(45) Date of Patent: Apr. 25, 2017

(54) SERVER, CLIENT TERMINAL, SYSTEM, AND PROGRAM

(71) Applicant: SONY CORPORATION, Minato-ku (JP)

(72) Inventors: Takatoshi Nakamura, Kanagawa (JP); Yoichiro Sako, Tokyo (JP); Mitsuru Takehara, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/370,139

(22) PCT Filed: Jan. 29, 2013

(86) PCT No.: PCT/JP2013/000466
§ 371 (c)(1),
(2) Date: Jul. 1, 2014

(87) PCT Pub. No.: WO2013/118460
PCT Pub. Date: Aug. 15, 2013

(65) Prior Publication Data
US 2014/0340535 A1    Nov. 20, 2014

(30) Foreign Application Priority Data

Feb. 8, 2012 (JP) ................. 2012-024772

(51) Int. Cl.
*H04N 5/232* (2006.01)
*H04N 1/21* (2006.01)
*H04N 101/00* (2006.01)

(52) U.S. Cl.
CPC ....... *H04N 5/23206* (2013.01); *H04N 1/2129* (2013.01); *H04N 5/232* (2013.01); *H04N 5/23293* (2013.01); *H04N 2101/00* (2013.01)

(58) Field of Classification Search
CPC ........... H04N 5/23206; H04N 5/23293; H04N 1/00323
(Continued)

(56) References Cited

U.S. PATENT DOCUMENTS

| | | | | |
|---|---|---|---|---|
| 2005/0165542 A1* | 7/2005 | Noguchi | ................ | G01C 21/36 348/207.99 |
| 2006/0001757 A1* | 1/2006 | Sawachi | ................ | G01C 21/20 348/333.12 |

(Continued)

FOREIGN PATENT DOCUMENTS

| | | |
|---|---|---|
| EP | 1 703 426 A1 | 9/2006 |
| JP | 09-200666 A | 7/1997 |

(Continued)

OTHER PUBLICATIONS

International Search Report issued Aug. 6, 2013 in PCT/JP2013/000466.

(Continued)

*Primary Examiner* — Christopher K Peterson
(74) *Attorney, Agent, or Firm* — Oblon, McClelland, Maier & Neustadt, L.L.P.

(57) ABSTRACT

An information processing system that acquires position information corresponding to a position of an information processing apparatus; acquires orientation information corresponding to an orientation of the information processing apparatus; obtains image data based on the position information and orientation information; and outputs the obtained image data.

19 Claims, 8 Drawing Sheets

(58) Field of Classification Search
USPC .................................................. 348/207.1
See application file for complete search history.

(56) References Cited

U.S. PATENT DOCUMENTS

| | | |
|---|---|---|
| 2006/0250507 A1 | 11/2006 | Miyajima et al. |
| 2009/0198661 A1 | 8/2009 | Miyajima et al. |
| 2010/0149399 A1* | 6/2010 | Mukai et al. ............ 348/333.02 |
| 2010/0295971 A1 | 11/2010 | Zhu |
| 2013/0050507 A1* | 2/2013 | Syed et al. ................. 348/207.1 |

FOREIGN PATENT DOCUMENTS

| | | |
|---|---|---|
| JP | 2003-256803 A | 9/2003 |
| JP | 2003-323440 A | 11/2003 |
| JP | 2006-260338 A | 9/2006 |
| JP | 2009-86549 | 4/2009 |
| JP | 2009-118389 A | 5/2009 |
| JP | 2009-260600 A | 11/2009 |
| JP | 2009-284123 A | 12/2009 |
| JP | 2010-129032 A | 6/2010 |

OTHER PUBLICATIONS

Japanese Office Action issued Apr. 19, 2016 in Patent Application No. 2012-024772.
Japanese Office Action issued Nov. 29, 2016 in Application No. 2012-024772 (3 pages).
Chinese Office Action issued Dec. 28, 2016 in Chinese Application No. 201380007622.0 (with English translation), 23 pages.

* cited by examiner

| POSITION INFORMATION | DIRECTION INFORMATION | IMAGE DATA |
|---|---|---|
| P1 | D1-1 | I1-1 |
| P1 | D1-2 | I1-2 |
| P2 | D2-1 | I2-1 |
| ... | ... | ... |

13

SERVER, CLIENT TERMINAL, SYSTEM, AND PROGRAM

TECHNICAL FIELD

The present disclosure relates to a server, a client terminal, a system, and a program.

BACKGROUND ART

Recently, digital cameras that store and save a subject image as a digital image signal in a storage medium have been spread. These digital cameras record and save an image when the image is displayed on a viewfinder.

On the other hand, in the following patent literature (PTL) 1, a digital camera capable of acquiring a past or future image of a specific target image is proposed. Specifically, when a user has specified a past date, the digital camera described in the following PTL 1 uploads the specified date, position information of the digital camera, and the like to a server and acquires a corresponding past image from the server. The digital camera displays the acquired past image when a shutter button is pressed.

CITATION LIST

Patent Literature

PTL 1: JP 2006-260338A

Summary

Technical Problem

Thus, the digital camera described in the above-described PTL 1 displays a past/future image of a currently viewed landscape, thereby enabling the user to experience virtual time travel.

On the other hand, if a zoom operation is generally performed in the digital camera, a display can be performed by approaching a remote landscape according to a telescopic function, but there is a limit in a zoom factor. In addition, it is difficult to display optically invisible landscapes such as landscapes of an opposite side of a subject. However, if remote landscapes can be sequentially displayed infinitely according to a zoom operation, the user can experience virtual world travel.

It is desirable to provide a novel and improved server, client terminal, system, and program capable of virtually continuing a zoom operation in a direction in which a client terminal is directed.

Solution to Problem

According to one exemplary embodiment, the disclosure is directed to an information processing system comprising: one or more processing units that acquire position information corresponding to a position of an information processing apparatus; acquire orientation information corresponding to an orientation of the information processing apparatus; obtain image data based on the position information and orientation information; and outputs the obtained image data.

The information processing apparatus may be one of a video camera, a smart phone, a personal digital assistant, a personal computer, a portable phone, a portable music player, a portable video processing device, a portable gaming device, a telescope and binoculars.

The one or more processing units may obtain the image data by searching a database that includes image data associated with position information and direction information The one or more processing units may recognize a position in the vicinity of an axis extending from the position of the information processing apparatus in a direction determined based on the orientation information, and obtain the image data by searching a database that includes image data associated with position information and identifying image data that matches the recognized position.

According to another exemplary embodiment, the disclosure is directed to a method performed by an information processing system, the method comprising: acquiring position information corresponding to a position of an information processing apparatus; acquiring orientation information corresponding to an orientation of the information processing apparatus; obtaining, by one or more processing units of the information processing system, image data based on the position information and orientation information; and outputting the obtained image data.

According to another exemplary embodiment, the disclosure is directed to a non-transitory computer-readable medium including computer program instructions, which when executed by an information processing system, causes the information processing system to perform a process including: acquiring position information corresponding to a position of an information processing apparatus; acquiring orientation information corresponding to an orientation of the information processing apparatus; obtaining image data based on the position information and orientation information; and outputting the obtained image data.

Advantageous Effects of Invention

According to the embodiments of the present disclosure described above, it is possible to virtually continue a zoom operation in a direction in which a client terminal is directed.

DESCRIPTION OF EMBODIMENTS

Figure 1:
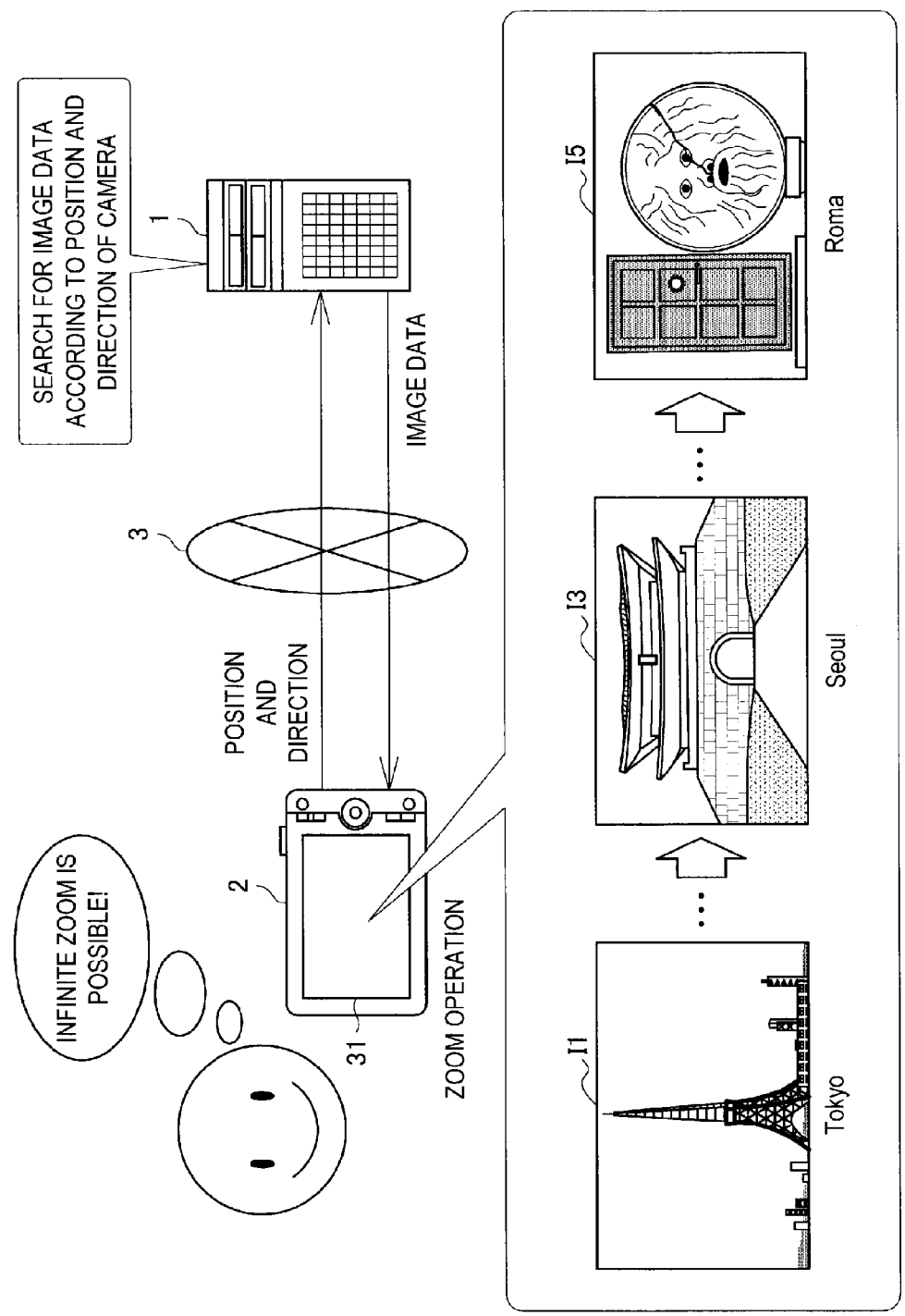
FIG. 1 is a diagram illustrating an outline of an infinite zoom system in accordance with an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

In addition, description will be given in the following order.
1. Outline of Infinite Zoom System in Accordance with Embodiment of Present Disclosure
2. Basic Configuration
2-1. Server
2-2. Digital Camera
3. Display Control
4. Summary

1. Outline of Infinite Zoom System in Accordance with Embodiment of Present Disclosure First, the outline of the infinite zoom system in accordance with the embodiment of the present disclosure will be described with reference to FIG. 1. As illustrated in FIG. 1, the infinite zoom system in accordance with the embodiment of the present disclosure has a server 1 and a digital camera 2 (a client terminal). In addition, the server 1 and the digital camera 2 are connectable via a network 3.

Here, when the normal digital camera has performed the zoom operation, an image closer to a subject is displayed according to a telescopic function of optically changing a focal length. However, because it is difficult to infinitely approach a remote landscape in the normal telescopic function, there is a limit in an optical zoom. In addition, in a digital zoom that enlarges part of the captured image, it is difficult to reproduce a landscape (optically invisible landscape) of an opposite side of a subject not originally imaged on the captured image.

According to an embodiment of the present disclosure, image data to which position information indicating a position in a direction in which the client terminal is directed is added is displayed in order from a position closer to the client terminal according to the zoom operation. Thereby, because the user can infinitely approach remote landscapes, the user can have a sense as if he/she travels around the world.

For example, if the digital camera 2 in accordance with this embodiment images a landscape at hand, an image obtained by imaging a subject is displayed on the display unit 31. If the user performs the zoom operation, the image of the subject is gradually enlarged according to the telescopic function. In addition, while a zoomed captured image of the subject is displayed according to the zoom operation, the digital camera 2 transmits position information and direction information (for example, an imaging direction) of the digital camera 2 to the server 1, and receives remote image data in the imaging direction searched by the server 1.

If the user continues a forward zoom operation (zoom-in operation) in substantially the horizontal direction and approaches the subject according to the telescopic function up to the limit thereof, the digital camera 2 displays remote image data of the imaging direction received from the server 1 on the display unit 31.

If the digital camera 2 is directed in a west direction in the example illustrated in FIG. 1, an image I1 of Tokyo of a present point and remote image data in the west direction, for example, an image I3 of Seoul and an image I5 of Roma, are sequentially displayed according to the zoom operation. In addition, further, if the forward zoom operation (zoom-in operation) continues in substantially the horizontal direction, an image of a back view of the user acquired from a video of a surrounding monitoring camera or the like may be finally displayed after the circulation around the earth.

The outline of the infinite zoom system in accordance with the embodiment of the present disclosure has been described above. Hereinafter, configurations of the server 1 and the digital camera 2 (a client terminal) included in the infinite zoom system will be described in detail.

Although the digital camera 2 is illustrated as the client terminal in FIG. 1, the client terminal in accordance with this embodiment is not limited thereto, and may be, for example, a video camera, a smart phone with a camera, a personal digital assistant (PDA), a personal computer (PC), a portable phone, a portable music player apparatus, a portable video processing apparatus, a portable game device, a telescope, or binoculars, or the like. In addition, the client terminal in accordance with this embodiment is not limited to an apparatus with the camera. For example, any apparatus capable of acquiring position information and/or direction information of the apparatus such as an apparatus with a global positioning system (GPS) or a direction sensor can be applied. Further, any apparatus capable of manually inputting position information and/or direction information of the apparatus can be applied even when there is no GPS or direction sensor.

2. Basic Configuration

2-1. Server

Figure 2:
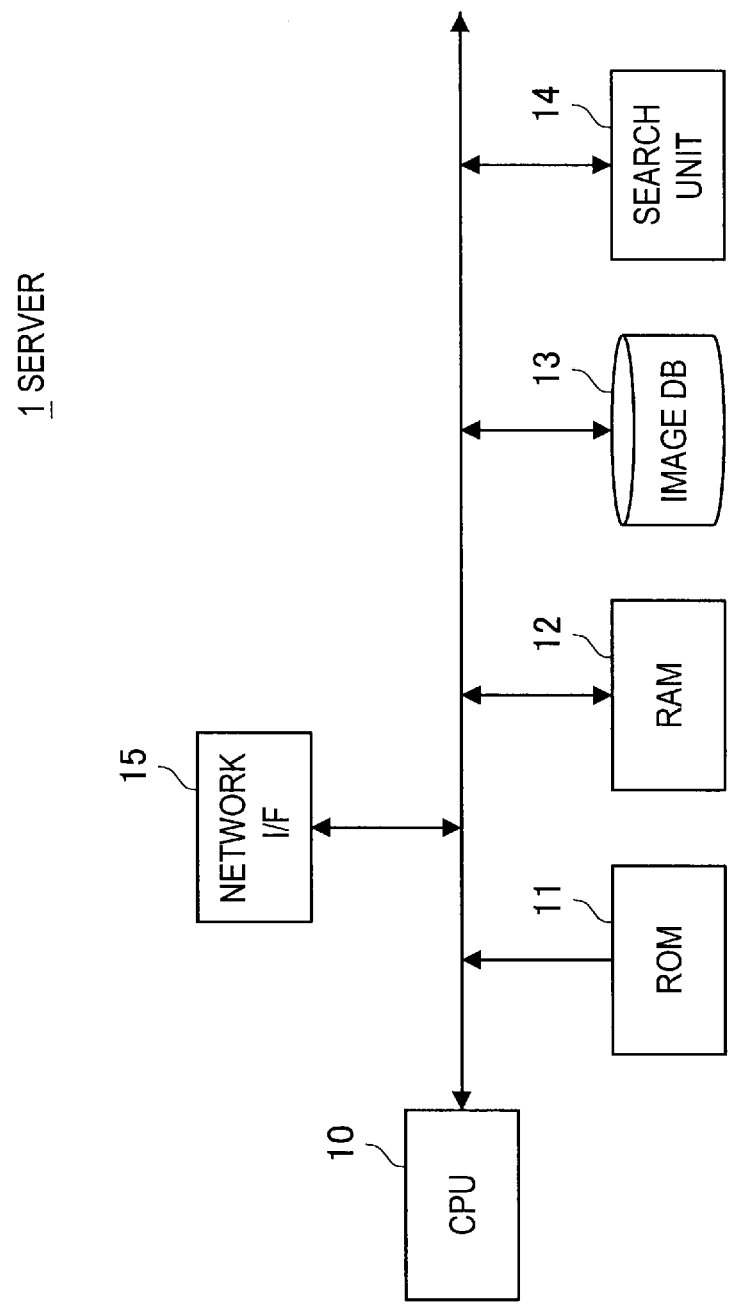
FIG. 2 is a block diagram illustrating a configuration of a server in accordance with an embodiment of the present disclosure.

FIG. 2 is a block diagram illustrating a configuration of the server 1 in accordance with an embodiment of the present disclosure. As illustrated in FIG. 2, the server 1 has a central processing unit (CPU) 10, a read only memory (ROM) 11, a random access memory (RAM) 12, an image database (DB) 13, a search unit 14, and a network interface (I/F) 15. Hereinafter, these elements will be described.

(Image DB 13)

The image DB 13 stores image data in association with information such as position information (for example, longitude/latitude and the like indicating an imaging point) and direction information (for example, an imaging direction). Here, an example of data stored by the image DB 13 is illustrated in FIG. 3.

Figures 3, 4:
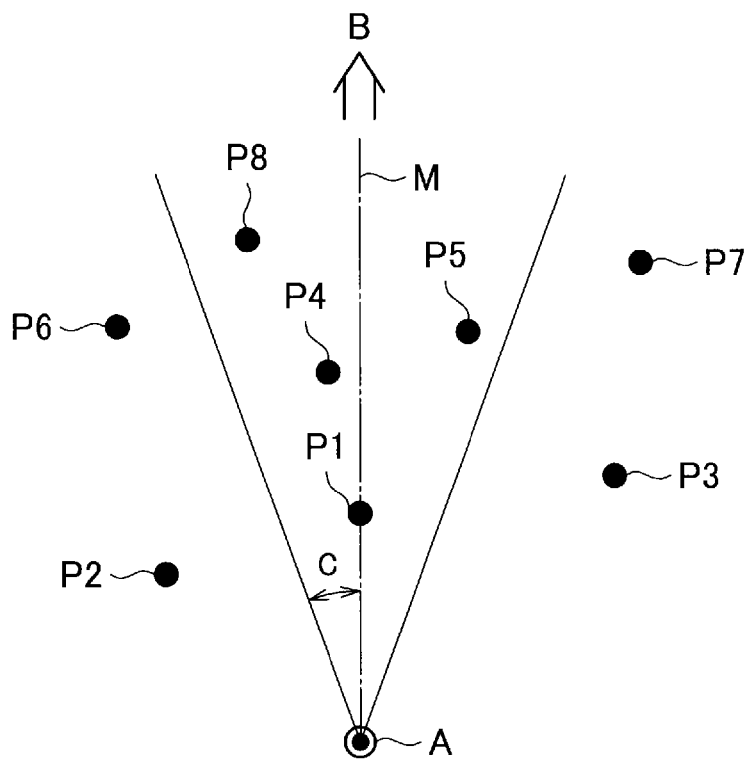
FIG. 3 is a diagram illustrating an example of data stored in an image database (DB).
FIG. 4 is a diagram illustrating a search of image data corresponding to a position and direction of a digital camera.

As illustrated in FIG. 3, the image DB 13 in accordance with this embodiment stores the image data in a state in which the image data is associated with position information P, direction information D, and image data I (in a state in which the position information P and the direction information D are added to the image data I). In the example illustrated in FIG. 3, image data I1-1 captured in a direction D1-1 from a position P1, image data I1-2 captured in a different direction D1-2 from the same position P1, and the like are stored. Although an example in which the position information P and the direction information D are associated with the image data I has been described above, this embodiment is not limited thereto. Information on the altitude of the imaging point, an imaging date, an imaging time band, weather during imaging, and the like may be associated with the image data I. In addition, the image DB 13 may store thumbnail images for the image data I.

(Search Unit 14)

The search unit 14 searches for image data from among image data stored in the image DB 13 based on position information and direction information of the digital camera 2 received from the digital camera 2. Here, a specific search method by the search unit 14 will be described with reference to FIG. 4.

FIG. 4 is a diagram illustrating a search of image data corresponding to a position A and a direction B of the digital camera 2. As illustrated in FIG. 4, the search unit 14 recognizes a position in the vicinity of an axis M extending in the direction B indicated by the direction information of the digital camera 2 from the position A indicated by the position information of the digital camera 2. For example, in the example illustrated in FIG. 4, the search unit 14 recognizes positions P1, P4, P5, and P8 within a range of a predetermined angle C from the axis M as positions in the vicinity of the axis M.

The search unit 14 searches the image DB 13 for image data to which position information indicating a position in the vicinity of the axis M is added and direction information indicating a direction substantially the same as the direction B of the digital camera 2 are added. The search unit 14 in accordance with this embodiment as described above performs a search while also considering direction information added to the image data, thereby giving the user a sense of a virtual infinite zoom in which a zoom continues in a direction toward the digital camera 2 more realistically.

Further, when information on an altitude, an angle of elevation, an imaging date, an imaging time band, weather during imaging, and the like of the digital camera 2 during imaging can be acquired, the search unit 14 may search for image data of a situation closer to a current situation in which the user captures an image based on the information. In addition, the search unit 14 can provide the user with a sense that the user travels around the world in real time by searching for image data in consideration of a time difference, a difference in weather, and the like.

(Network I/F 15)

The network I/F 15 is a communication module for transmitting/receiving data to/from the digital camera 2 over the network 3. For example, the network I/F 15 in accordance with this embodiment receives position information and direction information or transmits one or more image data searched by the search unit 14.

(CPU 10, ROM 11, and RAM 12)

The ROM 11 stores a software program or the like for searching for image data using the above-described search unit 14 or transmitting the searched image data to the digital camera 2 through the network I/F 15. The CPU 10 executes a process using the RAM 12 as a work area according to the above-described software program stored in the ROM 11.

2-2. Digital Camera

Figure 5:
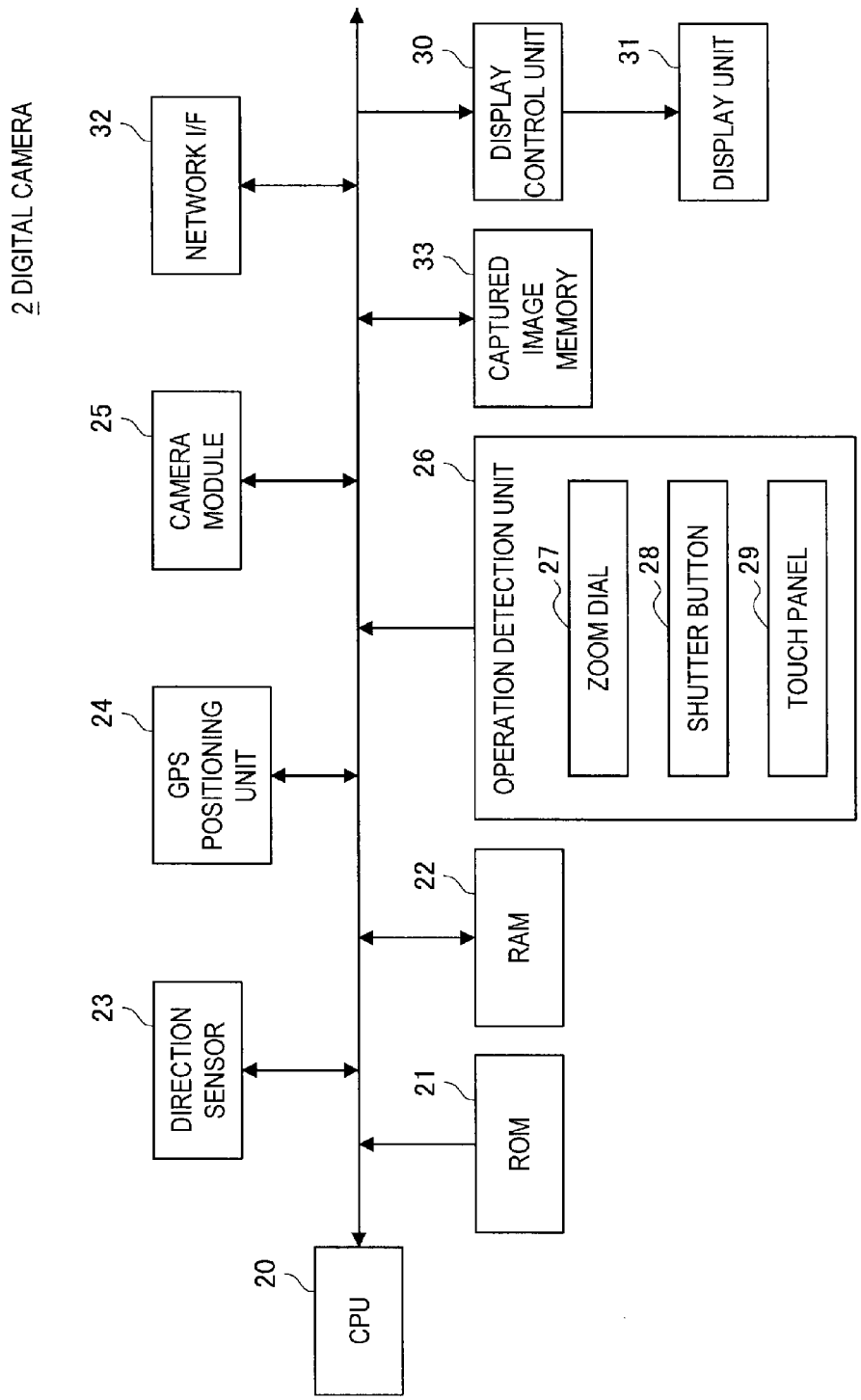
FIG. 5 is a block diagram illustrating a configuration of a digital camera in accordance with an embodiment of the present disclosure.

Next, a configuration of the digital camera 2 will be described with reference to FIG. 5. FIG. 5 is a block diagram illustrating the configuration of the digital camera 2 in accordance with this embodiment.

As illustrated in FIG. 5, the digital camera 2 has a CPU 20, a ROM 21, a RAM 22, a direction sensor 23, a GPS positioning unit 24, a camera module 25, an operation detection unit 26, a captured image memory 33, a display control unit 30, a display unit 31, and a network I/F 32. Hereinafter, these elements will be described.

The ROM 21 stores a program for transmitting position information and direction information to the server 1, acquiring image data searched from the server 1 based on the position information and the direction information, and displaying/recording the acquired image data in addition to a program for performing an imaging function. In addition, the CPU 20 executes the program stored in the ROM 21 using the RAM 22 as the work area.

The direction sensor 23 senses a direction of an optical axis of a lens optical system of the camera module 25, that is, an imaging direction, and outputs information (direction information) on the sensed imaging direction. Although the digital camera 2 having the camera module 25 as an example of the client terminal is included here, the client terminal in accordance with this embodiment is not limited to an apparatus with a camera as described above. In the case of the client terminal that does not have the camera, the direction sensor 23 may output a direction in which a specific portion of the client terminal is directed as direction information.

The GPS positioning unit 24 receives radio waves from a GPS satellite, senses a position at which the digital camera 2 is located, and outputs information on the sensed position. The GPS positioning unit 24 is an example of a position information acquisition unit that senses the position of the digital camera 2 based on a signal acquired from an outside. In addition, the position information acquisition unit may sense a position, for example, using wireless fidelity (Wi-Fi) communication, transmission/reception to/from a portable phone, a personal handy-phone system (PHS), or a smart phone, or near distance communication, or the like.

The camera module 25 includes an imaging element, an imaging optical system including an imaging lens, and a captured image signal processing unit, and outputs data of a captured image of a digital signal. The imaging element is implemented, for example, by a charge coupled device (CCD) imager or a complementary metal oxide semiconductor (CMOS) imager.

The operation detection unit 26 is a touch panel 29 or the like that detects an operation on a physical key group of a button, a switch, a dial, and the like or a key group displayed on the display unit 31 for detecting various operations by a user. The CPU 20 executes a process corresponding to the user's operation detected by the operation detection unit 26 according to the program of the ROM 21.

Here, a zoom dial 27, a shutter button 28, and the like are included as a key group for operating the camera. The detection of the zoom operation in accordance with this embodiment is not limited to the zoom dial 27 illustrated in FIG. 5. For example, an operation detection unit by other physical structures such as a zoom switch, a button, and the like may perform the detection. A zoom operation screen is displayed on the display unit 31 and an operation on the zoom operation screen may be detected by the touch panel 29.

The display control unit 30 controls a display of display content of a display screen displayed on the display unit 31 according to control by the CPU 20 based on the program of the ROM 21. Although the display control unit 30 controls the display unit 31 provided in the digital camera 2 in the examples illustrated in FIGS. 1 and 5, the display control unit 30 in accordance with this embodiment is not limited thereto, and may control a display in a connected external display apparatus.

In addition, the display control unit 30 in accordance with this embodiment controls searched remote image data to be sequentially displayed according to a zoom operation. This display control will be described in detail in <3. Display Control>.

According to control of the display control unit 30, the display unit 31 displays an image of a subject output from the camera memory 25 in real time in addition to a menu screen, various operation screens, and the like, or displays a captured image stored in the captured image memory 33. The display unit 31 is implemented, for example, by a liquid crystal display (LCD), an organic light-emitting diode (OLED), or the like. In addition, the display unit 31 in accordance with this embodiment displays remote image data received from the server 1.

The network I/F 32 is a communication module for performing data transmission/reception to/from the server 1 over the network 3. For example, the network I/F 32 in accordance with this embodiment transmits position information output from the GPS positioning unit 24 and direction information output from the direction sensor 23 or receives searched image data.

As the captured image memory 33, for example, a flash memory such as a card memory is used. In addition, the captured image memory 33 may be a recording medium such as a digital versatile disc (DVD). Further, the captured image memory 33 may be a hard disk apparatus instead of such a removable memory medium.

In addition, the captured image memory 33 may store an image of a subject continuously output from the camera module 25 as a captured image according to a timing of a shutter operation detected by the shutter button 28. In this case, the captured image memory 33 may record position information output from the GPS positioning unit 24, direction information output from the direction sensor 23, and the like together as meta-information.

Further, when remote image data received as the search result from the server 1 is displayed on the display unit 31, the captured image memory 33 in accordance with this embodiment may store the displayed image data as a captured image according to a timing at which the shutter button 28 has been operated. Thereby, the user can cause a landscape viewed in a virtual world travel destination (image data displayed on the display unit 31) to be stored in the captured image memory 33 at a desired timing.

The configuration of the digital camera 2 in accordance with an embodiment of the present disclosure has been in detail described above. Next, display control of image data corresponding to a zoom operation in accordance with this embodiment will be described with reference to FIG. 6.

3. Display Control

Figure 6:
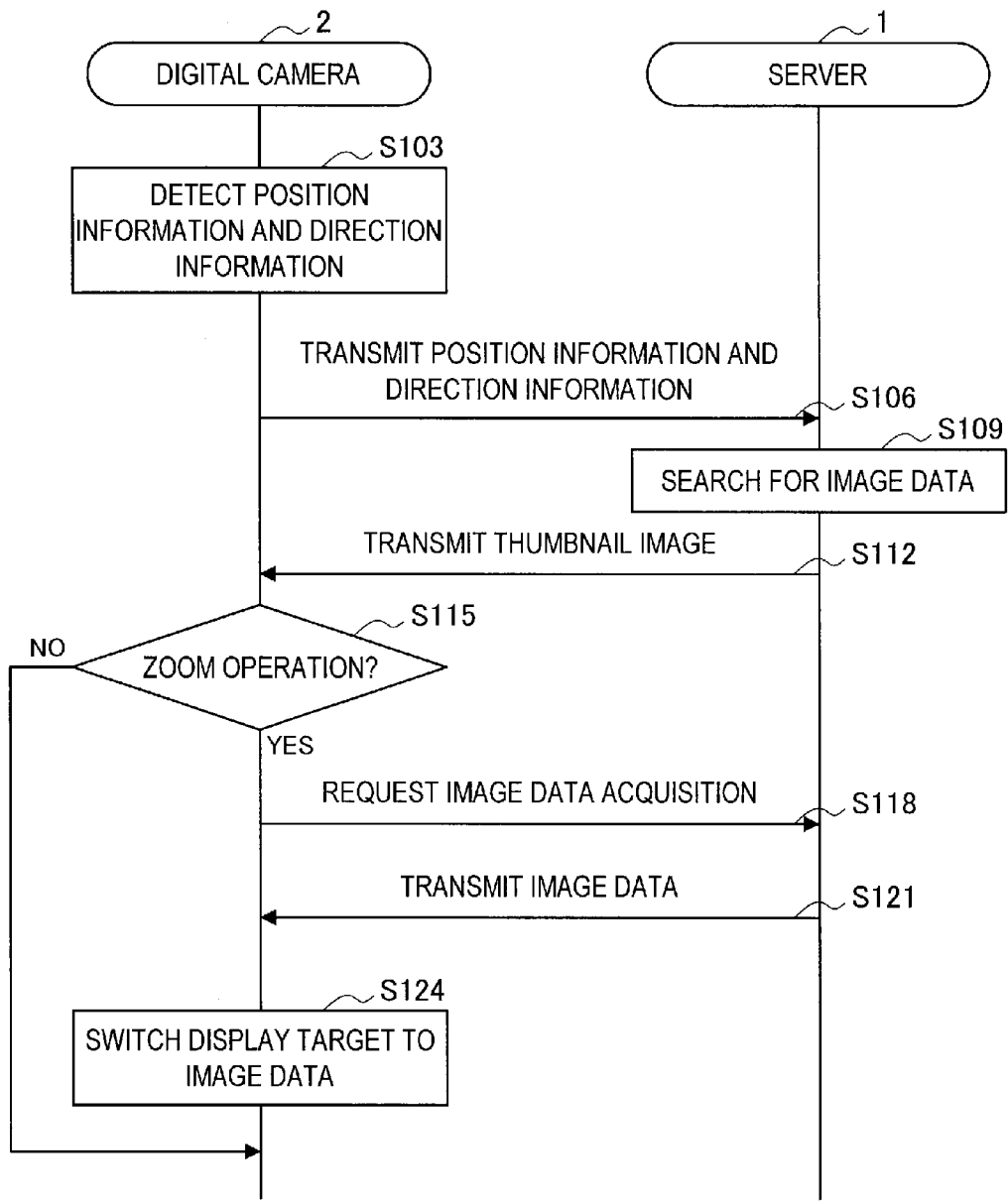
FIG. 6 is a sequence diagram illustrating a display control process in accordance with this embodiment.

FIG. 6 is a sequence diagram illustrating a display control process in accordance with this embodiment. As illustrated in FIG. 6, first, in step S103, the digital camera 2 detects direction information using the direction sensor 23 and detects position information using the GPS positioning unit 24.

Then, in step S106, the digital camera 2 transmits the position information and the direction information to the server 1.

Next, in step S109, the search unit 14 of the server 1 searches for image data to which position information in the vicinity of a direction in which the digital camera 2 is directed is added based on the position information and the direction information received from the digital camera 2.

Then, in step S112, the server 1 transmits one or more thumbnail images of searched image data to the digital camera 2. The transmitted thumbnail images are temporarily stored (cached) in the digital camera 2. As described above, the digital camera 2 can recognize a position in which there is image data by pre-transmitting the thumbnail images.

Next, if the operation detection unit 26 of the digital camera 2 detects a zoom operation in step S115, the digital camera 2 requests an image data acquisition to the server 1 according to the zoom operation in the subsequent step S118.

For example, when a zoom-in operation has been performed, the digital camera 2 requests the image data acquisition to the server 1 in order from original data (image data) of a thumbnail image to which position information indicating a position closer to the digital camera 2 is added among one or more thumbnail images transmitted from the server 1. In addition, when a zoom-out operation has been performed, the digital camera 2 requests the image data acquisition to the server 1 in order from original data (image data) of a thumbnail image to which position information indicating a position closer to the digital camera 2 than a position indicated by position information of currently displayed image data is added.

When the zoom operation in a position in which there is no image data has been performed, the digital camera 2 may provide notification indicating that there is no image data by performing an alarm display to the user and provide the user with notification indicating that there is no image data in advance.

Then, in step S121, the server 1 transmits image data in response to the acquisition request from the digital camera 2. For example, the server 1 may perform transmission in order from image data to which position information indicating a position closer to the digital camera 2 is added among the image data searched in the above-described step S109 according to the acquisition request by the digital camera 2.

Next, in step S124, the digital camera 2 controls switching of an image (display target image) displayed on the display unit 31 to image data received in the above-described step S121. Here, the switching control by the display control unit 30 will be described below.

(Display Switching Control)

The display control unit 30 may perform switching control with a transition effect that switching of a screen is smoothly viewed. Hereinafter, an example of the transition effect will be described with reference to FIG. 7.

Figure 7:
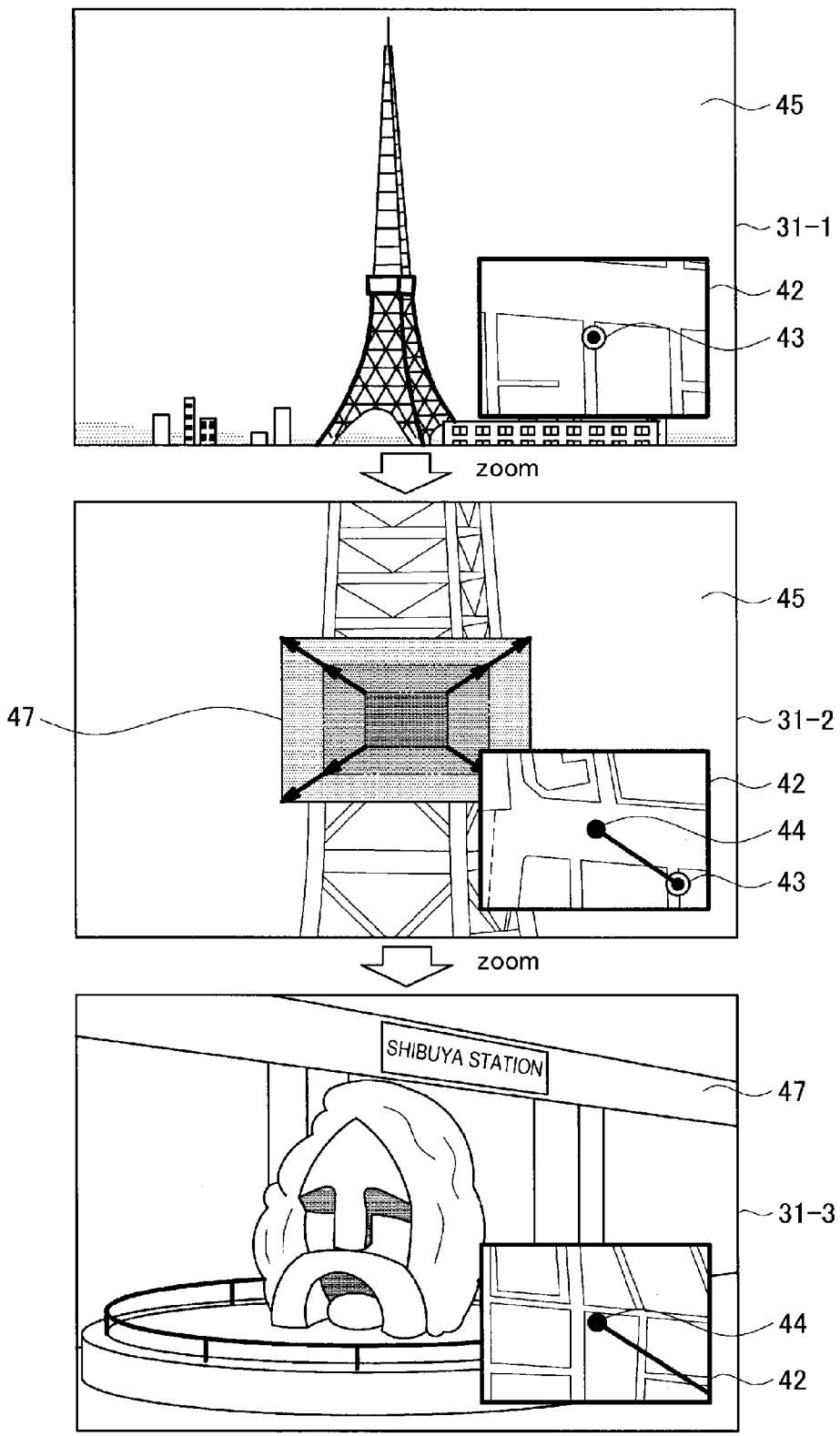
FIG. 7 is a screen transition diagram illustrating an example of display screen switching in accordance with this embodiment.

FIG. 7 is a screen transition diagram illustrating an example of display screen switching. First, in the display screen 31-1 of FIG. 7, for example, a captured image 45 output from the camera module 25 is displayed in real time. In this case, the display control unit 30 may also display a map indicator 42, which works with a zoom operation. The map indicator 42 includes a map and a present location indication 43 indicating a present location.

Next, if the zoom operation is detected, the display control unit 30 switches a display screen by performing fade-out/fade-in while enlarging a captured image 45 and image data 47 (which may be a thumbnail image) as illustrated in a display screen 31-2.

In this case, the display control unit 30 may control a map and a zoom position indication 44 included in the map indicator 42 to work with the zoom operation, and display a point to which a zoom is made from the present location.

Because image data 47 of a landscape optically invisible from the present point is displayed according to the zoom operation as illustrated in a display screen 31-3, the user can perform the zoom operation in a sense that the user actually approaches a distant point.

In addition, for the transition effect of display switching, alpha value display control may be used in addition to the above-described enlargement display control or in combination with the enlargement display control.

Further, the display control unit 30 may change a speed or type of transition effect according to a distance between a present point and a zoom point (a position indicated by position information added to image data of a switch target).

Switching control by the display control unit 30 has been described above in detail. Next, image data to be searched when the digital camera 2 is located inside a building in an image data search by the search unit 14 of the server 1 illustrated in the above-described step S109 will be described.

(Image Data of Inside of Building)

Although an image of an external appearance of the building is illustrated as an example of image data to be displayed according to a zoom operation in FIGS. 1 and 7, the image data in accordance with this embodiment is not limited thereto. For example, when the user is located inside the building, the search unit 14 may designate the image data of the inside of the building as a search target. Hereinafter, the case in which an infinite zoom in accordance with this embodiment starts from the inside of the building will be described with reference to FIG. 8.

Figure 8:
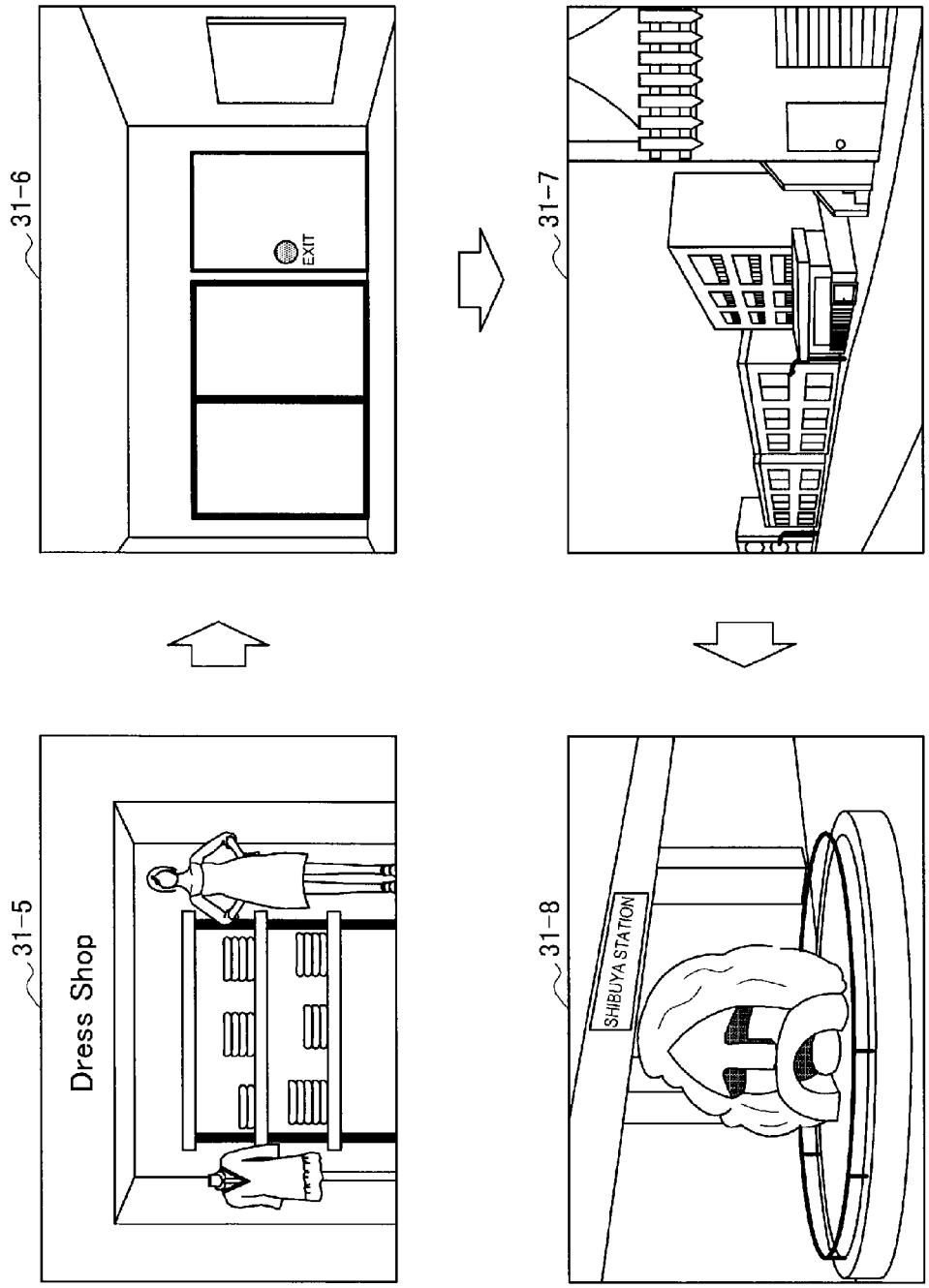
FIG. 8 is a diagram illustrating an example of screen transition in accordance with this embodiment.

FIG. 8 is a diagram illustrating an example of screen transition in the display unit 31 of the digital camera 2. As described in FIG. 8, a captured image 45 output from the camera module 25 is first displayed in real time on a display screen 31-5. Here, because the user is located inside the building, a range optically visible from a present position inside the building is displayed on the display screen 31-5.

Next, if the zoom dial 27 is operated and the zoom operation is detected, the camera module 25 performs normal zoom imaging. Further, the infinite zoom system in accordance with this embodiment displays image data zoomed to an optically invisible position.

Here, when a position indicated by the position information transmitted from the digital camera 2 is inside the building, the search unit 14 searches for image data to which position information indicating a position, which is inside the building, in the vicinity of the imaging direction of the digital camera 2 is added. As the search result, for example, image data obtained by imaging the exit of the building from an inside as on a display screen 31-6 is searched and displayed.

Then, if the user continues the zoom operation, image data of an outside of the building is displayed as illustrated on a display screen 31-7. From here, images of external appearances of the building are sequentially displayed according to the zoom operation as illustrated in FIGS. 1 and 7 described above.

It is also possible to designate image data of an inside of a building as a search target when the digital camera 2 is positioned inside the building as described above and perform a search considering security or privacy by preventing the designation of image data of an inside of another building as the search target.

(Filtering Corresponding to Classification)

Next, when classification information (meta-information) indicating a classification of an image is added to image data, the display control unit 30 may filter and then display the image data in consideration of the classification information. For example, the display control unit 30 can sequentially display only image data of a famous spot based on the classification information according to the zoom operation.

(Display Control Based on Creator Information)

Next, display control when creator information of an image is added to image data will be described. In this case, the display control unit 30 may perform display control so that it can be visually discriminated whether the displayed image data has been created by a user himself/herself, another user, or a community the user has joined based on the creator information.

In addition, a visible discrimination method, for example, may be performed by a text display, an illustration display of a person, a face photo display, a frame display (discrimination by color), or the like. Hereinafter, a specific example will be described with reference to FIG. 9.

Figure 9:
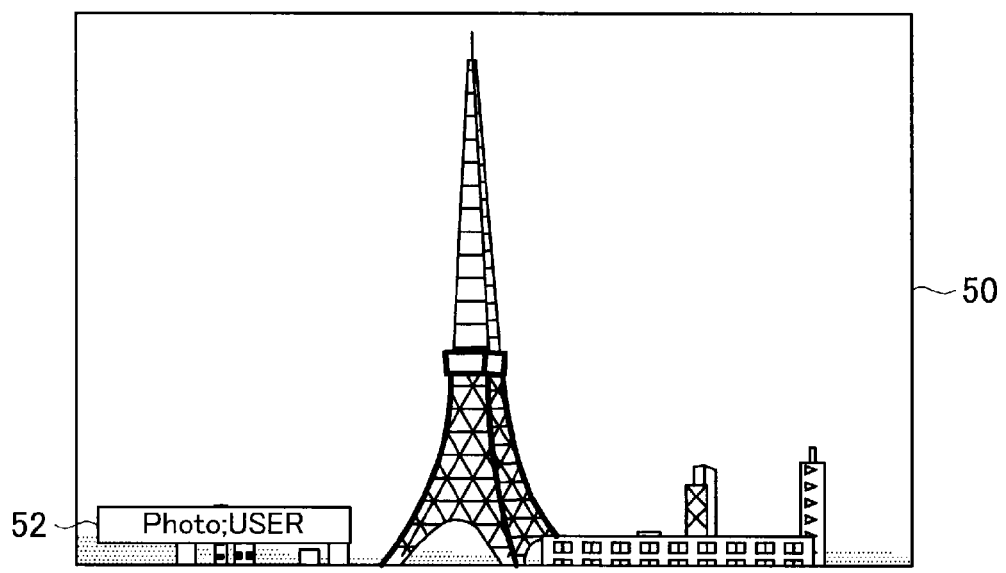
FIG. 9 is a diagram illustrating an example in which a photographer of image data is designated by text.
Figure 9:
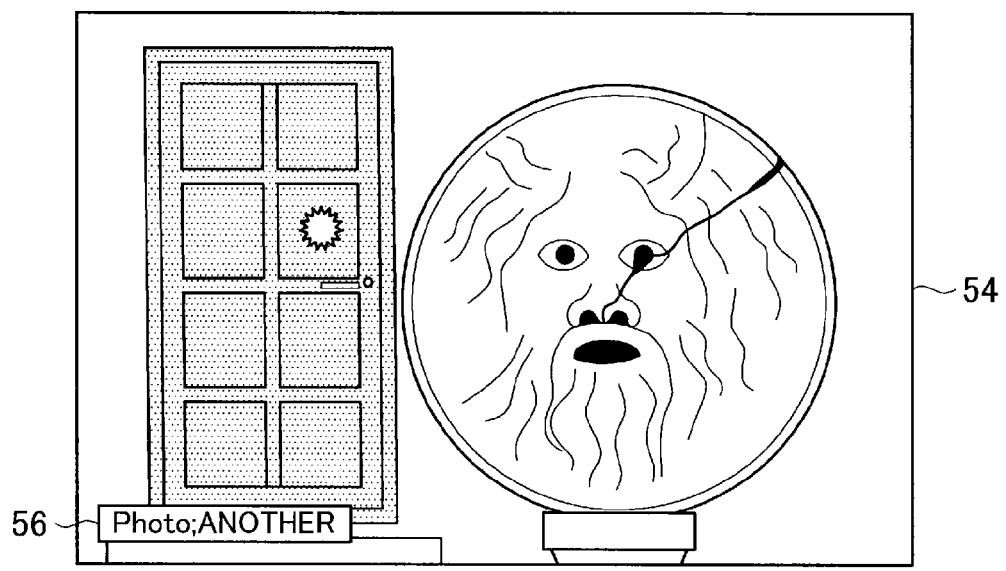

FIG. 9 is a diagram illustrating an example in which a photographer of image data is designated by text. As illustrated in FIG. 9, text 52 indicating as "Photo; USER" is displayed when image data 50 is an image captured by the user himself/herself, and text 56 indicating as "Photo; ANOTHER" is displayed when image data 54 is an image captured by another person.

4. Summary

As described above, the infinite zoom system in accordance with this embodiment can provide experience as if the user travels around the world by sequentially displaying remote images optically invisible in a direction in which a client terminal is directed according to a zoom operation.

It should be understood by those skilled in the art that various modifications, combinations, sub-combinations and alterations may occur depending on design requirements and other factors insofar as they are within the scope of the appended claims or the equivalents thereof.

Although a thumbnail image of image data searched by the server 1 is transmitted, for example, in step S112 of FIG. 6, a process in accordance with this embodiment is not limited thereto. For example, in step S112, image data itself searched by the server 1 may be transmitted. In this case, when there is a zoom operation in step S115, the digital camera 2 can display image data temporarily stored in a cache of the digital camera 2 on the display unit 31 without having to perform processes of steps S118 and S121.

In addition, although steps S106 and S109 are performed before step S115 in the process illustrated in FIG. 6, a sequence of the process in accordance with this embodiment is not limited thereto. For example, after step S115, a process of steps S106, S118, S109, and S121 may continue.

In addition, image data searched by the search unit 14 of the above-described server 1 is not limited to a still image, and may be, for example, a moving image. In addition, the digital camera 2 in accordance with this embodiment may also capture and record a moving image in addition to a still image.

In addition, in this embodiment, a scale factor calculated based on a position (zoom position) indicated by position information to be added to image data to be displayed may be displayed as a zoom factor display.

In addition, although the digital camera 2 acquires image data from the server 1 in the above-described embodiment, an acquisition destination of image data in accordance with this embodiment is not limited to a specific server. The acquisition destination of the image data may be, for example, an unspecified number of servers or PCs on the Internet having functions of the image DB 13 and the search unit 14.

In addition, the configuration of the client terminal in accordance with this embodiment is not limited to the example illustrated in FIG. 5. For example, in addition to the configuration illustrated in FIG. 5, the client terminal in accordance with this embodiment may further have the image DB and the search unit. In this case, the client terminal can search for image data from a local image DB.

Although an example in which images on the earth in a direction in which the client terminal is directed in substantially the horizontal direction are sequentially displayed according to the zoom operation has been described in the above-described embodiment, the infinite zoom system in accordance with this embodiment is not limited thereto. For example, when the client terminal is directed upward, an image of a galaxy may be displayed if images of the sky, moon, sun, and the like are sequentially displayed according to the zoom operation and the zoom operation continues in an upward direction. As described above, it is possible to provide the user with a sense as if the user travels in cosmic space by also displaying an image of the cosmic space according to the zoom operation.

In addition, when the client terminal is directed downward, images in the ground (or the sea), images of the mantle, and images of an opposite side of the earth through the mantle may be sequentially displayed according to the zoom operation.

Additionally, the present technology may also be configured as below.

(1) An information processing system comprising: one or more processing units that acquire position information corresponding to a position of an information processing apparatus; acquire orientation information corresponding to an orientation of the information processing apparatus; obtain image data based on the position information and orientation information; and outputs the obtained image data.

(2) The information processing system of (1), wherein the orientation information indicates a direction that a front surface of the information processing apparatus is facing.

(3) The information processing system of any of (1) to (2), wherein the obtained image data includes thumbnail image data.

(4) The information processing system of any of (1) to (3), wherein the information processing apparatus is one of a video camera, a smart phone, a personal digital assistant, a personal computer, a portable phone, a portable music player, a portable video processing device, a portable gaming device, a telescope and binoculars.

(5) The information processing system of any of (1) to (4), wherein the one or more processing units obtain the image data by searching a database that includes image data associated with position information and direction information.

(6) The information processing system of any of (1) to (5), wherein the one or more processing units recognize a position in the vicinity of an axis extending from the position of the information processing apparatus in a direction determined based on the orientation information.

(7) The information processing system of (6), wherein the one or more processing units obtain the image data by searching a database that includes image data associated with position information and identifying image data that matches the recognized position.

(8) The information processing system of any of (1) to (7), wherein the one or more processing units obtain a plurality of image data based on the position information and orientation information.

(9) The information processing system of (8), wherein the one or more processing units obtain the plurality of image data in sequence by first obtaining image data associated with position information that is closest to the position of the information processing apparatus, and sequentially obtaining image data associated with positions that extend further away from the position of the information processing apparatus.

(10) The information processing system of any of (1) to (9), wherein the one or more processing units acquire at least one of an altitude, an angle of elevation, a date, a time and information indicating weather conditions associated with the position information and the orientation information.

(11) The information processing system of (10), wherein the one or more processing units obtain the image data based on the position information, the orientation information and the at least one of the altitude, the angle of elevation, the date, the time and the information indicating weather conditions.

(12) The information processing system of any of (1) to (11), wherein the image data including images corresponding to real objects that are not in plain view when viewed from the position of the information processing apparatus.

(13) The information processing system of any of (1) to (12), further comprising: a database including image data associated with position information, direction information, and classification information, wherein the one or more processing units obtain the image data by searching the database for image data matching the acquired position and orientation information and filtering a result of the search based on the classification information.

(14) The information processing system of any of (1) to (13), further comprising: a database including image data associated with position information, direction information, and creator information identifying a creator of the image data, wherein the one or more processing units obtain the image data by searching the database for image data matching the acquired position and orientation information and filtering a result of the search based on the creator information.

(15) The information processing system of any of (1) to (14), wherein the information processing system is one of a video camera, a smart phone, a personal digital assistant, a personal computer, a portable phone, a portable music player, a portable video processing device, a portable gaming device, a telescope and binoculars.

(16) The information processing system of any of (1) to (14), wherein the information processing system is a server.

(17) The information processing system of any of (1) to (16), wherein the information processing apparatus includes an imaging unit that captures image data; an orientation sensor that detects the orientation of the information processing apparatus; a position determining unit that determines the position of the information processing apparatus; a first communication interface that outputs the position information corresponding to the position of the information processing apparatus and the orientation information corresponding to the orientation of the information processing apparatus; and a display that displays the obtained image data.

(18) The information processing system of any of (1) to (14), further comprising: a server including a second communication interface that receives the position information and the orientation output by the first communication interface of the information processing apparatus; and a first processing unit of the one or more processing units that obtains the image data based on the position information and orientation information, wherein the first processor controls the second communication interface to output the obtained image data to the information processing apparatus.

(19) The information processing system of (18), wherein the information processing apparatus includes a user interface that receives a user input instructing a zoom in or zoom out operation of the imaging unit; and a second processing unit of the one or more processing units that controls the first communication interface to transmit a request for image data to the server based on a zoom in or zoom out operation performed by the imaging unit.

(20) The information processing system of any of (1) to (14), wherein the information processing apparatus includes an imaging unit that captures image data; a user interface that receives a user input instructing a zoom in or zoom out operation of the imaging unit; a display; and a first processing unit of the one or more processing units that controls the display to display at least one of the captured image data and the obtained image data.

(21) The information processing system of (20), wherein the first processing unit controls the display to display the captured image data and, upon receiving a user input instructing a zoom in operation of the imaging unit, controls the display to display the obtained image data.

(22) A method performed by an information processing system, the method comprising: acquiring position information corresponding to a position of an information processing apparatus; acquiring orientation information corresponding to an orientation of the information processing apparatus; obtaining, by one or more processing units of the information processing system, image data based on the position information and orientation information; and outputting the obtained image data.

(23) A non-transitory computer-readable medium including computer program instructions, which when executed by an information processing system, causes the information processing system to perform a process including: acquiring position information corresponding to a position of an information processing apparatus; acquiring orientation information corresponding to an orientation of the information processing apparatus; obtaining image data based on the position information and orientation information; and outputting the obtained image data.

(24)
A server comprising:
a reception unit configured to receive position information indicating a position of a client terminal and direction information indicating a direction in which the client terminal is directed from the client terminal;
a search unit configured to search for a plurality of pieces of image data to which position information indicating a position in the vicinity of an axis extending in the direction indicated by the direction information from the position indicated by the position information and direction information that is substantially the same as the direction information are added; and
a transmission unit configured to transmit the plurality of pieces of image data searched by the search unit to the client terminal.

(25)
The server according to (24), wherein the transmission unit transmits the searched plurality of pieces of image data in order from image data to which position information indicating a position closer to the position of the client terminal is added.

(26)
The server according to (24) or (25), wherein creator information of the image data is added to the image data.

(27)
The server according to any one of (24) to (26), wherein classification information indicating a classification of the image data is added to the image data.

(28)
A client terminal comprising:
a transmission unit configured to transmit position information indicating a position of the client terminal and direction information indicating a direction in which the client terminal is directed to a server;
a reception unit configured to receive a plurality of pieces of image data to which position information indicating a position in the vicinity of an axis extending in the direction indicated by the direction information from the position indicated by the position information is added from the server; and
a display control unit configured to display the plurality of pieces of image data received by the reception unit.

(29)
The client terminal according to (28), wherein the display control unit performs control so that one of the plurality of pieces of image data is selectively displayed.

(30)
The client terminal according to (28) or (29), wherein the display control unit performs control so that the plurality of pieces of image data are sequentially displayed from image data to which position information indicating a position closer to the position of the client terminal indicated by the position information is added.

(31)
The client terminal according to any one of (28) to (30), further comprising: an operation detection unit configured to detect a user's operation,
wherein the display control unit performs control so that the plurality of pieces of image data are selectively displayed according to the user's operation detected by the operation detection unit.

(32)
The client terminal according to (31), wherein the display control unit switches image data of a display target to image data to which position information on a position farther from the client terminal is added according to a continuous first user operation detected by the operation detection unit.

(33)
The client terminal according to (31) or (32), wherein the display control unit switches image data of a display target to image data to which position information on a position closer to the client terminal is added according to a continuous second user operation detected by the operation detection unit.

(34)
The client terminal according to any one of (28) to (33), wherein the reception unit receives a plurality of pieces of image data to which position information indicating a position in the vicinity of an axis extending in the direction indicated by the direction information from the position indicated by the position information and direction information that is substantially the same as the direction information are added from the server.

(35)
The client terminal according to any one of (28) to (34), wherein creator information of the image data is added to the image data, and
wherein the display control unit controls a display so that a user of the client terminal or another user can be visually discriminated to be a creator based on the creator information of image data to be displayed.

(36)
The client terminal according to any one of (28) to (35), wherein classification information indicating a classification of an image is added to the image data, and wherein the display control unit displays filtered image data based on the classification information.

(37)

A system comprising:

a search unit configured to search for a plurality of pieces of image data to which position information indicating a position in the vicinity of an axis extending in a direction indicated by direction information indicating the direction in which a client terminal is directed from a position indicated by position information indicating a position of the client terminal is added; and a display control unit configured to display the plurality of pieces of image data searched by the search unit.

(38)

A program for causing a computer to execute:

receiving position information indicating a position of a client terminal and direction information indicating a direction in which the client terminal is directed from the client terminal;

searching for a plurality of pieces of image data to which position information indicating a position in the vicinity of an axis extending in the direction indicated by the direction information from the position indicated by the position information and direction information that is substantially the same as the direction information are added; and transmitting the plurality of pieces of image data searched in the searching process to the client terminal.

(39)

A program for causing a computer to execute:

transmitting position information indicating a position of a client terminal and direction information indicating a direction in which the client terminal is directed to a server;

receiving a plurality of pieces of image data to which position information indicating a position in the vicinity of an axis extending in the direction indicated by the direction information from the position indicated by the position information is added from the server; and controlling a display of the plurality of pieces of image data received in the receiving process.

(40)

A program for causing a computer to execute:

searching for a plurality of pieces of image data to which position information indicating a position in the vicinity of an axis extending in a direction indicated by direction information indicating the direction in which a client terminal is directed from a position indicated by position information indicating a position of the client terminal is added; and controlling a display of the plurality of pieces of image data searched in the searching process.

REFERENCE SIGNS LIST

1 Server
2 Digital camera
3 Network
13 Image database (DB)
14 Search unit
15, 32 Network interface (I/F)
23 Direction sensor
24 GPS positioning unit
25 Camera module
26 Operation detection unit
27 Zoom dial
28 Shutter button
29 Touch panel
30 Display control unit
31 Display unit
33 Captured image memory
42 Map indicator

The invention claimed is:

1. An information processing system comprising:
circuitry configured to
receive, from an information processing apparatus when a user of the information processing apparatus zooms in on an object, position information indicating a position of the information processing apparatus, orientation information indicating a direction in which the information processing apparatus is directed and zoom-in information;
recognize area position information that indicates an area that is in the direction extending from the position of the information processing apparatus according to the position information, the orientation information and the zoom-in information;
determine whether the position of the information processing apparatus is inside of the zoomed-in object;
search for a plurality of image data associated with the area position information and the orientation information, the plurality of image data including map images of the area position information and images, created by either the user or a creator different from the user, of the zoomed-in object, the plurality of image data including images captured inside of the zoomed-in object when the position of the information processing apparatus is inside of the zoomed-in object; and
transmit the searched plurality of image data to the information processing apparatus, the searched plurality of image data corresponding to the position information, the orientation information and the zoom-in information.

2. The information processing system of claim 1, wherein the direction is in which a front surface of the information processing apparatus is facing.

3. The information processing system of claim 1, wherein the searched image data includes thumbnail image data.

4. The information processing system of claim 1, wherein the information processing apparatus is one of a video camera, a smart phone, a personal digital assistant, a personal computer, a portable phone, a portable music player, a portable video processing device, a portable gaming device, a telescope and binoculars.

5. The information processing system of claim 1, wherein the circuitry searches a database that includes image data associated with the area position information and the orientation information.

6. The information processing system of claim 1, wherein the circuitry searches a database that includes image data associated with the area position information and identifying image data that matches the recognized area position information.

7. The information processing system of claim 1, wherein the circuitry obtains the plurality of image data in sequence by first searching for image data associated with position information that is closest to the position of the information processing apparatus, and sequentially searching for image data associated with positions that extend further away from the position of the information processing apparatus.

8. The information processing system of claim 1, wherein the circuitry receives at least one of an altitude, an angle of elevation, a date, a time and information indicating weather conditions associated with the position information and the orientation information.

9. The information processing system of claim 8, wherein the circuitry searches for the plurality of image data based on the position information, the orientation information and the at least one of the altitude, the angle of elevation, the date, the time and the information indicating weather conditions.

10. The information processing system of claim 1, wherein
the plurality of image data including images corresponding to real objects that are not in plain view when viewed from the position of the information processing apparatus.

11. The information processing system of claim 1, further comprising:
a database including image data associated with the area position information, the orientation information, and classification information, wherein
the circuitry obtains the plurality of image data by searching the database for image data matching the recognized area position information and the orientation information and filtering a result of the search based on the classification information.

12. The information processing system of claim 1, further comprising:
a database including image data associated with the area position information, the orientation information, and creator information identifying a creator of the image data, wherein
the circuitry obtains the plurality of image data by searching the database for image data matching the recognized area position information and the orientation information and filtering a result of the search based on the creator information.

13. The information processing system of claim 1, wherein
the information processing system is one of a video camera, a smart phone, a personal digital assistant, a personal computer, a portable phone, a portable music player, a portable video processing device, a portable gaming device, a telescope, and binoculars.

14. The information processing system of claim 1, wherein
the information processing system is a server.

15. The information processing system of claim 1, wherein
the information processing apparatus includes
an imaging processing circuit that captures image data;
an orientation sensor that detects the orientation information of the information processing apparatus;
a position determining circuit that determines the position information of the information processing apparatus;
a first communication interface that sends the position information indicating the position of the information processing apparatus and the orientation information to the circuitry and receives the plurality of image data from the circuitry; and
a display that displays the received plurality of image data.

16. The information processing system of claim 1, wherein
the plurality of image data includes information of the creator.

17. The information processing system of claim 1, wherein
the zoom-in information includes a zoom factor and a changed focal length based on a distance from the information processing apparatus to the zoomed-in object.

18. A method performed by an information processing system, the method comprising:
receiving, by circuitry, from an information processing apparatus when a user of the information processing apparatus zooms in on an object, position information indicating a position of the information processing apparatus, orientation information indicating a direction in which the information processing apparatus is directed and zoom-in information;
recognizing, by the circuitry, area position information that indicates an area that is in the direction extending from the position of the information processing apparatus according to the position information, the orientation information and the zoom-in information;
determining, by the circuit, whether the position of the information processing apparatus is inside of the zoomed-in object;
searching, by the circuitry, for a plurality of image data associated with the area position information and the orientation information, the plurality of image data including map images of the area position information and images, created by either the user or a creator different from the user, of the zoomed-in object, the plurality of image data including images captured inside of the zoomed-in object when the position of the information processing apparatus is inside of the zoomed-in object; and
transmitting, by the circuitry, the searched plurality of image data to the information processing apparatus, the searched plurality of image data corresponding to the position information, the orientation information and the zoom-in information.

19. A non-transitory computer-readable medium including computer program instructions, which when executed by circuitry of an information processing system, causes the circuitry to execute a method comprising:
receiving, from an information processing apparatus when a user of the information processing apparatus zooms in on an object, position information indicating a position of the information processing apparatus, orientation information indicating a direction in which the information processing apparatus is directed and zoom-in information;
recognizing area position information that indicates an area that is in the direction extending from the position of the information processing apparatus according to the position information, the orientation information and the zoom-in information;
determining whether the position of the information processing apparatus is inside of the zoomed-in object;
searching for a plurality of image data associated with the area position information and the orientation information, the plurality of image data including map images of the area position information and images, created by either the user or a creator different from the user, of the zoomed-in object, the plurality of image data including images captured inside of the zoomed-in object when the position of the information processing apparatus is inside of the zoomed-in object; and
transmitting the searched plurality of image data to the information processing apparatus, the searched plurality of image data corresponding to the position information, the orientation information and the zoom-in information.

\* \* \* \* \*